United States Patent [19]

Ellis

[11] Patent Number: 4,542,292
[45] Date of Patent: Sep. 17, 1985

[54] CORRECTION OF NATURAL GAMMA RADIATION LOGS FOR THE EFFECTS OF GAMMA RAY EMISSION FROM AND ATTENUATION BY THE BOREHOLE FLUID

[75] Inventor: Darwin V. Ellis, Ridgefield, Conn.

[73] Assignee: Schlumberger Technology Corporation, New York, N.Y.

[21] Appl. No.: 364,202

[22] Filed: Apr. 1, 1982

[51] Int. Cl.$^4$ ............................................. G01V 5/00
[52] U.S. Cl. ..................................... 250/256; 250/262
[58] Field of Search ............... 250/256, 262, 268, 269, 250/266

[56] References Cited

U.S. PATENT DOCUMENTS

| | | | |
|---|---|---|---|
| 3,521,063 | 7/1970 | Tittman | 250/268 |
| 3,900,733 | 8/1975 | Seeman | 250/262 |
| 4,096,385 | 6/1978 | Marett | 250/262 |
| 4,436,996 | 3/1984 | Arnold et al. | 250/256 |
| 4,439,676 | 7/1984 | Smith et al. | 250/256 |
| 4,493,998 | 1/1985 | Smith et al. | 250/252.1 |

FOREIGN PATENT DOCUMENTS 2099143A 4/1982 United Kingdom .

OTHER PUBLICATIONS

Cox, J. W., et al., The Effect of Potassium-Salt Muds on Gamma Ray, and Spontaneous Potential Measurements, SPWLA 1976.

Primary Examiner—Janice A. Howell
Attorney, Agent, or Firm—Cooper, Dunham, Clark, Griffin & Moran

[57] ABSTRACT

Disclosed are a method and a system for natural gamma radiation well logging in which the radiation detected in five energy windows is converted into a log of thorium, uranium and potassium (Th,U,K) which is corrected for the presence of gamma radiation emitting materials (e.g., potassium) and strong gamma radiation attenuators (e.g., barite and/or hematite) in the borehole fluid.

37 Claims, 11 Drawing Figures

CORRECTION OF NATURAL GAMMA RADIATION LOGS FOR THE EFFECTS OF GAMMA RAY EMISSION FROM AND ATTENUATION BY THE BOREHOLE FLUID

BACKGROUND AND SUMMARY OF THE INVENTION

The invention is in the field of well logging, in which measurements taken in a borehole are used in searching for and exploiting valuable underground resources such as oil and gas. It is particularly directed to a method and a system for natural gamma radiation logging, in which a log is derived of the radiation detected in selected energy windows and is converted into a log of selected subsurface materials, such as thorium, uranium and potassium. Yet more specifically, the invention is directed to deriving a log of the selected subsurface materials which is substantially corrected for errors due to factors such as radiation emitting materials (e.g. potassium, in the form of potassium chloride) in the borehole fluid, and radiation absorbing materials, such as barite and/or hematite, in the same mud filtrate.

In prior art natural gamma radiation logging, a tool capable of detecting gamma radiation in each respective one of several (e.g. five) energy windows is passed through a selected borehole interval, and a record is made of the gamma ray photons detected within the respective windows. The gamma rays are emitted in the decay of subsurface material such as thorium, uranium and potassium (Th,U,K), each of which emits rays with characteristic energy spectra. The tool output is converted to a log of the concentrations of Th,U,K at the respective borehole depth levels.

The Th,U,K log is important in searching for and exploiting underground resources because it is believed that these materials appear in nature with a discernible relationship to geology and rock morphology. This log is particularly useful in the exploration for and exploitation of oil and gas resources because it is believed that the concentrations of Th,U,K taken individually or in combination are a good indication of previously unavailable information as to the presence, type and volume of shale or clay in the formations surrounding the borehole.

While the fact that Th, U and K emit characteristic and discrete energy spectra should in principle allow the detected radiation to be separated by source material, in practice the nature of the logging process makes the detected spectra continuous, with poor energy resolution and poor counting statistics. Nevertheless, there are known techniques for usefully estimating and logging the Th,U,K concentrations.

The difficult measurement conditions in Th,U,K logging have been made yet more difficult in recent times by the more common use of borehole fluids (drilling mud) containing potassium chloride (KCl) and weighting materials which are strong absorbers of gamma rays, such as barite and/or hematite (B). These borehole fluids stabilize the borehole by reducing clay and shale hydration and provide various other benefits. However, the KCl in the borehole fluid emits its own gamma radiation whose contribution is merged with that of potassium in the undisturbed formations surrounding the borehole, while the strong absorber (B) in the same borehole fluid can significantly reduce the gamma radiation flux from the surrounding formations. Typically, the drilling and logging environment makes it impossible or impractical to measure the concentration of KCl and B in the mud at the time the borehole logging commences, and no prior art technique is known which satisfactorily corrects for their effect on the Th,U,K log. Accordingly, a major aspect of the invention is directed to a process and a system for substantially overcoming the deleterious effect of this type of borehole fluid in natural gamma radiation logging used to find the concentrations of materials such as thorium, uranium and potassium in the undisturbed formations around the borehole.

It is known that barite in the mud has a significant effect in nuclear (scattered gamma radiation) logging. See Seeman U.S. Pat. No. 3,900,733 and references cited therein, for a discussion of techniques attempting to correct for the barite effect. It is also known that KCl in the mud filtrate has a significant effect in natural gamma radiation logging. See Cox, J. W. et al., "The Effect Of Potassium-Salt Muds On Gamma-Ray, And Spontaneous Potential Measurements," SPWLA 1976, and references cited therein. It is believed, however, that neither this nor other similar known prior art teaches techniques for satisfactorily correcting for these deleterious effects of the borehole fluid in natural gamma radiation logging.

In general terms, the invention comprises deriving a log of gamma radiation detected in selected energy windows, e.g., five, for a selected borehole interval, and converting it into a log of the selected materials, e.g. Th,U,K, which is substantially corrected for at least one of: (i) a gamma ray emitter in the borehole fluid, e.g., potassium salts and (ii) a gamma ray attenuator in the borehole fluid, e.g., a strong attenuator (B) such as barite and/or hematin. The invention makes use of the recognition that the availability of more than three (e.g., five) energy windows and the way Th, U and K contribute thereto can be used to find not only the three unknown concentrations Th,U,K but also at least one, and preferably both of two other factors: the KCl and B in the borehole fluid. More specifically, the invention makes use of the recognition that the potassium gamma rays contribute only or primarily to the three lowest energy windows and that the spectrum of gamma rays from the potassium in the borehole fluid is somewhat different from that in the undisturbed formations surrounding the borehole. The invention makes use of the additional recognition that the unscattered thorium gamma rays are detected mostly in window 5 and much less in window 4 while the unscattered uranium gamma rays are detected to a substantial extent in each of windows 4 and 5, and that the additional response in the lower windows for thorium and uranium is due primarily to interaction of the thorium and uranium gamma rays in the undisturbed formations, the borehole and the tool itself. The invention further makes use of the discovery that if the concentrations of thorium and uranium are estimated based only on the basis of the two highest energy windows, 4 and 5, these estimates should agree with the thorium and uranium is due primarily to interaction of the thorium and estimates based on all five windows if there is no KCl in the mud filtrate, and that a disagreement which cannot be attributed to statistical fluctuations can be used as a measure of the presence of mud filtrate KCl. The invention yet further makes use of the recognition that the strong absorber in the mud filtrate reduces the flux of low energy gamma rays reaching the tool, depresses the uranium estimate based on all five windows and increases the thorium estimate, and that the thorium and uranium estimates have about the same sensitivity to the strong absorber.

In a particular and nonlimiting example of an embodiment of the invention, the concentrations of the three materials (Th,U,K) are related through an empirically derived logging tool sensitivity matrix to five corrected window measurements. The first corrected window measurement is the output of the logging tool for window 1 modified by the unknown KCl concentration and B correction, and also modified for the caliper (diameter) of the borehole. The second and third corrected window measurements are the respective outputs of the second and third tool windows, respectively modified by the unknown KCl concentrations and by the borehole caliper. The fourth and fifth "corrected" window measurements are simply the outputs of the logging tool for the fourth and fifth windows. This can be done for each depth level in the selected borehole depth interval but, in order to reduce processing time, the tool window outputs can be averaged over several depth levels, particularly in intervals where the borehole does not change greatly, such that the depth interval for a sample of the energy windows log is, e.g., four feet rather than six inches. The borehole fluid potassium concentration (KCl) and strong absorber correction (B) are then found for each of the depth levels of interest.

The KCl concentrations and B corrections found as described above for the individual depth levels in the borehole typically differ significantly from one depth level to another. However, drilling and logging experience suggests that the KCl is typically well mixed in the borehole fluid, and that its concentration should be reasonably constant throughout the well. In the case of the strong absorber, experience suggests that its effective absorption should be mainly related to the caliper of the borehole and should not be significantly perturbed by variable mudcake build-up. A simple average of the KCl concentrations and B corrections found at the respective depth levels may in a given case be a close estimate of the true KCl and B content of the borehole fluid, but this need not be true in all cases because the scatter in the KCl and B estimates is due to many factors which could not be said to be linear or consistent from one depth to another or from one borehole to another. Hence, in accordance with another aspect of the invention, the simple averages of the KCl concentrations and B corrections are used only as the starting estimates in a process which finds the best fit of a KCl concentration and a B correction to the thorium and uranium estimates throughout the borehole depth interval which is of interest.

DETAILED DESCRIPTION

Figures 1, 2:
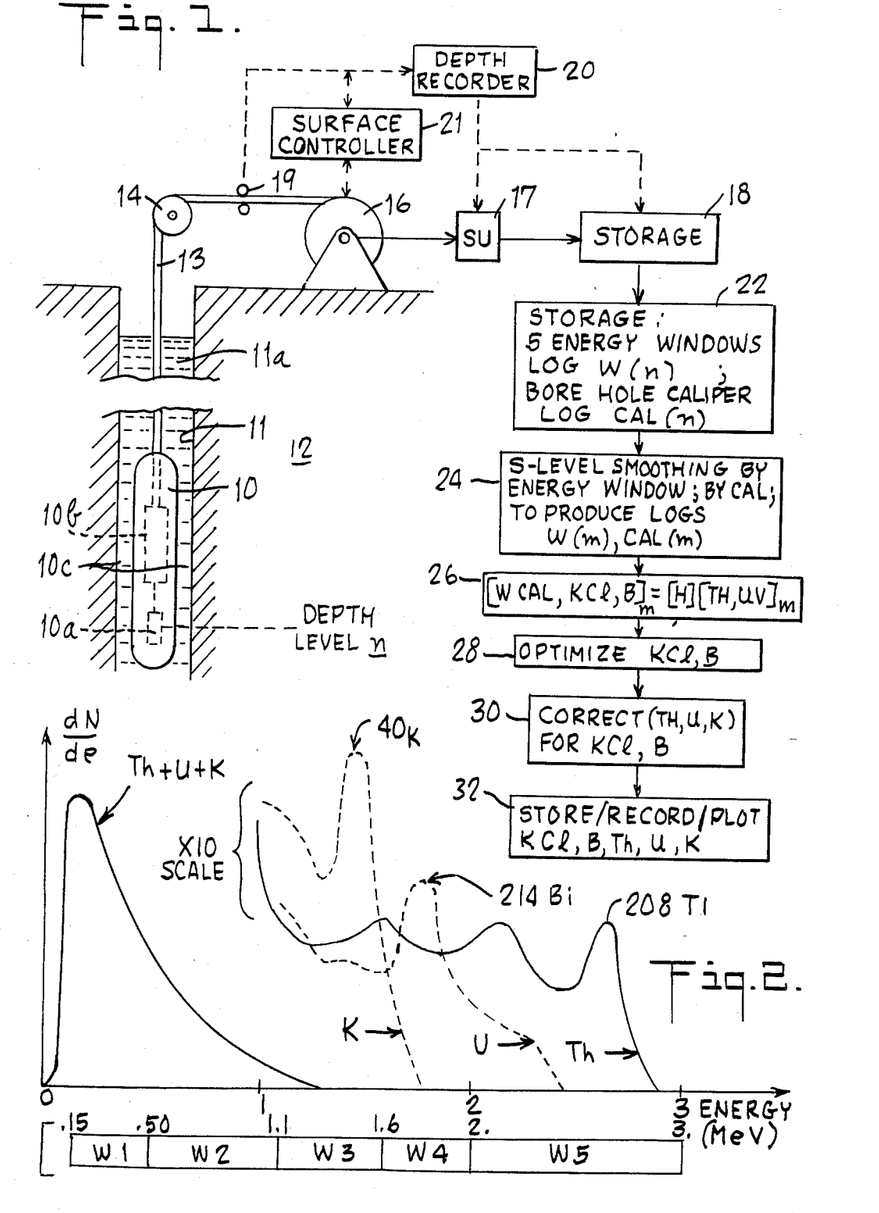
FIG. 1 illustrates the major components of a system carrying out an embodiment of the invented process.
FIG. 2 illustrates the characteristic spectra of thorium, uranium and potassium and the relationship thereto of the five energy windows of a particular logging tool.

FIG. 1 shows a logging tool 10 in a borehole 11 for investigating subsurface formations 12 by deriving a log thereof. In a particular embodiment, tool 10 logs the natural gamma radiation detected thereby in each of several energy windows, e.g. five. A particular example of such tool is designated NGT-A. Tool 10 is supported in borehole 11 by a cable 13 which passes over a sheave wheel 14 and is secured to a drum-and-winch mechanism 15. Mechanism 15 includes a suitable brush-and-slipring arrangement 16 for providing electrical connections between conductors within cable 13 and a unit 17 labelled SCU system which controls the supply of power and electrical signals to and from tool 10 via cable 13, and readies signals from the tool for application to a storage unit 18. Either or both of units 17 and 18 can include equipment for converting analog signals received from tool 10 into digital signals associated with the respective depth levels n in borehole 11 at which the analog signals have been derived by tool 10, as indicated by a wheel 19 which engages cable 13 and is linked with a depth recorder 20, which in turn is linked with either or both of units 17 and 18. Either or both of units 17 and 18 can include additional equipment for processing of logs to prepare them for use in the invented process. Storage 18 can store logs derived by separate measuring devices carried by the same tool 10 in one or more passes through borehole 11, logs derived from separate passes of different tools 10 through borehole 11 and/or logs derived from passes of tools 10 or other similar tools through different boreholes in the same or similar subsurface formations. A surface controller 21 controls the speed and position of tool 10 in borehole 11.

In the particular example where tool 10 is the natural gamma radiation tool designated NGT-A, it includes a scintillation detector schematically indicated at 10a which comprises a 12-inch long and 1¾ inch diameter sodium iodide crystal optically coupled to a photomultiplier and includes electronic circuitry schematically illustrated at 10b which takes the photomultiplier output and determines the amount of gamma rays in each of five energy windows. One example of the energy range of the windows is illustrated in FIG. 2, where the windows are designated W1, W2, W3, W4 and W5 and the MeV boundaries thereof are indicated. The vertical scale is in units of probability of emission of gamma ray photons, the leftmost curve indicates the spectrum of the total gamma radiation to which the tool is exposed and similarly the appropriately labelled three other curves indicate the potassium, uranium and thorium gamma rays to which the tool is exposed. Of course, FIG. 2 is for an idealized setting and does not take into account factors such as interaction of the emitted gamma rays with the formations surrounding the borehole, the borehole itself and the logging tool, nor does it take into account factors such as the influence of adjacent borehole depth levels on the one of interest at the time. What is of particular interest in this invention is that the curves in FIG. 2 do not take into account the influence of borehole fluid 11a in borehole 11. Fluid 11a always exerts some influence on the radiation detected by tool 10, if for no other reason than by simply attenuating at least some of the gamma rays from the formations surrounding the borehole before they reach detector 10a. In the particular example of fluid (mud) 11a which contains a gamma ray emitter such as potassium salts (e.g., chloride) and a strong gamma ray attenuator (e.g., barite and/or hematite), the influence of the borehole fluid is particularly troublesome, and one of the objects of the invention is to remove this deleterious effect. Note that the terms attenuation and absorption are used interchangeably here, although it is true that phenomena other than absorption can also contribute to attenuation.

The tool electronics indicated at 10b perform known pulse amplitude analysis on the output of the photomultiplier in the detector indicated at 10, to divide it into the five energy windows indicated at FIG. 2. The scintillation detector output for the time interval corresponding to a short borehole depth interval, e.g. 6 inches, is accumulated in each of the five energy windows, and the result is an energy windows log sample or component for the depth level n identifying the 6-inch depth interval. A sample or component of the energy windows log thus comprises five measurements, one for each respective one of the energy windows. The sequence of such samples or components taken at successive depth levels in the borehole makes up the energy windows log designated herein W(n).

Tool 10 can include a known caliper (borehole diameter) measuring device 10c which generates and sends up to the surface through cable 13 a caliper log comprising a sample for each depth level n in the borehole, (e.g. for each 6-inch borehole interval identified by its depth level n). The caliper log can also be stored in unit 18, after optional preprocessing in either or both of units 17 and 18, and is designated CAL(n) herein.

From unit 18, the five energy windows log W(n) and the borehole caliper log CAL(n) can be sent to another unit 22 directly by wire, or by a telecommunications link, or by another suitable technique, and then in unit 24 both of logs W(n) and CAL(n) are subjected to an S-level smoothing to produce therefrom respective logs W(m) and CAL(m). For example, each successive group of four depth levels of the logs W(n) and CAL(n) can be averaged into a respective single sample of the logs W(m) and CAL(m), to thereby reduce subsequent processing time. In unit 26, an initial estimate by depth level m is made of the KCl concentration and B correction which influence the gamma radiation detected by tool 10, to thereby derive a respective initial estimate of KCl and B for each depth level m in the borehole and to further derive an initial estimate of the concentrations of thorium, uranium and potassium in the undisturbed formations surrounding the borehole, also by depth level m in the borehole. These initial estimates are derived through the technique described in greater detail below. In unit 28 the initial estimates of the KCl concentration and B correction for the borehole fluid are optimized into a single value for KCl and a single value for B, and these values are used at step 30 to derive a log of the thorium, uranium and potassium concentrations in the undisturbed formations surrounding the borehole which is substantially corrected for the influence of the KCl and B in the borehole fluid. At step 32 the optimized estimates for KCl and B, and the corrected log of the Th,U,K concentrations can be stored or otherwise recorded or plotted, to thereby produce a tangible representation of the corrected Th,U,K log and/or the optimized borehole fluid KCl concentration and B correction.

Figure 3:
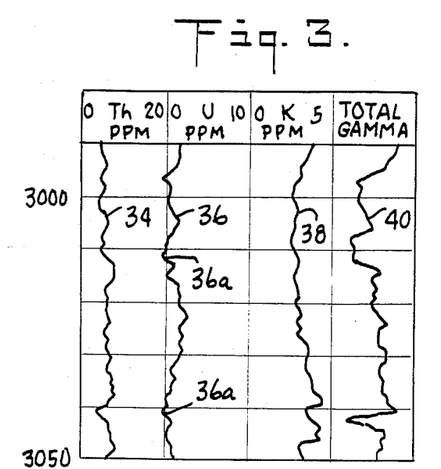
FIG. 3 illustrates a section of prior art log of thorium, uranium and potassium.

Referring to FIG. 3, an example is illustrated of the effect of KCl in the borehole fluid on the log of Th,U,K concentrations derived from a five-windows natural gamma radiation log in accordance with prior art techniques. As indicated, the vertical dimension is borehole depth in feet, the horizontal dimension for the thorium concentration curve 34 is parts per million on a scale from zero to 20, the horizontal dimension for the uranium concentration curve 36 is also in parts per million but on a scale from zero to 10 and the horizontal dimension of the potassium concentration curve 38 is in percent. Curve 40 is the total gamma radiation detected by tool 10 rather than the radiation detected in an individual energy window. This prior art Th,U,K log shows one immediately apparent inaccuracy—excursions into concentrations of uranium at 36a which are negative, a physical impossibility. It also shows an abnormally high level of the estimated thorium concentration indicated by curve 34. It is apparent from the illustrated log portion that the abnormally high level of the thorium curve cannot be cured by a simple background subtraction because it should also be applied to the uranium log which is already abnormally low in places.

Figure 4A:
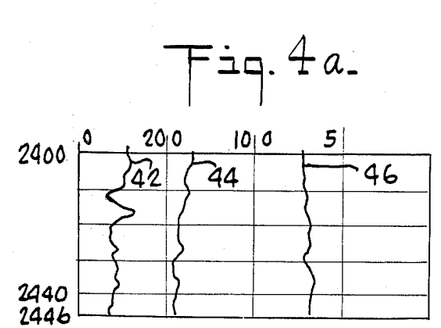
FIG. 4a illustrates another section of such a prior art log and FIG. 4b illustrates a log produced in accordance with the invention from the same window energy measurements from which the prior art log of FIG. 4a was produced.
Figure 4B:
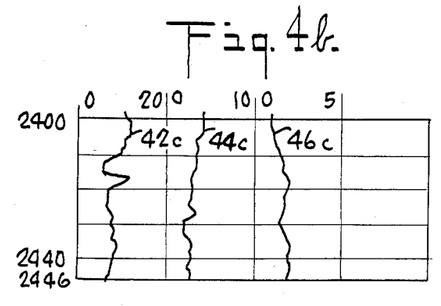

Another prior art Th,U,K log for a given borehole interval is illustrated in FIG. 4a, while the Th,U,K log for the same borehole depth interval corrected in accordance with the invention is illustrated in FIG. 4b. The uranium log has been raised to a higher level (but of course not by simple scaling) and the potassium and thorium logs have been lowered (again, not by simple scaling). The logs of FIG. 4b, corrected in accordance with the invention, are believed to be more consistent with the actual concentrations of Th,U,K in the undisturbed formations surrounding the borehole than the prior art logs of FIG. 4a.

Figure 5:
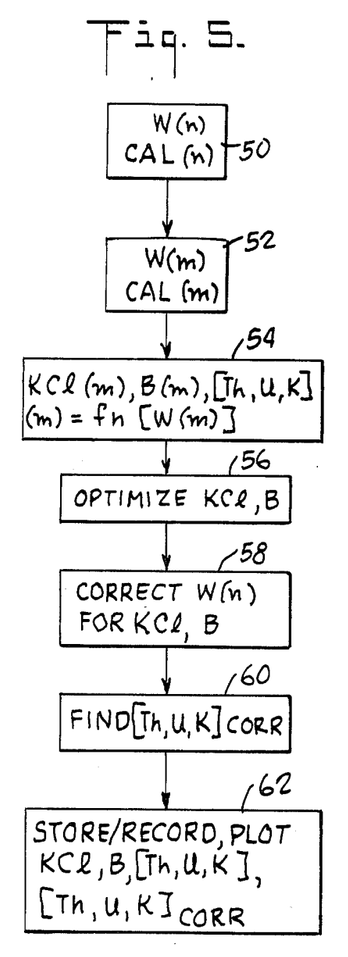
FIG. 5 illustrates the major steps of a process embodying the invention.

FIG. 5 illustrates in flow chart form the major steps of a nonlimiting example of a process in accordance with the invention. The process starts at step 50 with the windows log W(n) and caliper log CAL(n), e.g. as provided by unit 22 in FIG. 1. At step 52 these logs are converted to a windows log W(m) and a caliper log CAL(m). Each sample or component m is for a depth interval in the borehole made up of a selected number of the intervals identified by the depth index n. For example, each sample m can be made up of the averaged value of a respective group of, say, four samples n. The purpose is to improve the statistical accuracy of the measurements which make up the log samples W(n) and to reduce subsequent processing time. Step 52 is optional, and it is possible to practice the invented process by omitting this step altogether, in which case the subsequent processing would be by level n rather than by level m. At step 54 an estimate is made of the concentrations Th,U,K and the borehole fluid KCl concentration and B correction at the individual depth levels m as a function of the samples for the respective depth levels of the five-window log W(m). At step 56 optimized values are found for the KCl concentration and B correction, in a process described in detail below which finds a single KCl concentration and a single B correction which best fit the actual window measurements taken in the borehole. At step 58 the optimized KCl and B are used to correct the window log W(n) by removing from the individual measurements in windows 1, 2 and 3 the contributions from the KCl in the borehole fluid and by increasing the individual measurements in window 1 to account for the absorption of low energy gamma radiation by the strong absorber in the same borehole fluid. At step 60 the corrected W(n) log is used to find a corrected Th,U,K log, using the technique applied in the prior art to uncorrected windows logs to derive the Th,U,K concentrations, and at step 62 one or more of the logs and concentrations and corrections discussed above are stored, otherwise recorded or plotted to produce a tangible representation of the process results.

The process carried out at step 54 of FIG. 5 is based on relating the windows log W(n) and the Th,U,K concentrations in a manner which provides enough linear expressions for the unknowns of interest. In particular, it is known from the prior art five-window natural gamma radiation logging that the W(n) log sample for a given borehole depth level n can be related to the concentrations of the three materials Th, U and K at level n through a logging tool sensitivity matrix H which can be empirically derived and takes into account the logging tool response to given test conditions, e.g. in a test borehole containing known concentrations of Th, U and K. The relationship can be expressed as [W1,W2,W3,W4,W5]=H [Th,U,K], for a particular tool in a standard (8-inch, water filled) borehole. One example of this sensitivity matrix H has the numerical values:

| | | |
|---|---|---|
| 10.1366 | 21.7722 | 37.4768 |
| 3.27358 | 6.41613 | 16.5969 |
| .61623 | 1.61744 | 7.5186 |
| .32686 | .56565 | 0. |
| .46439 | .16434 | 0. |

Similar sensitivity matrices can be empirically found for relating 3-window, 4-window or 6 or more-window logs W(n) to Th,U,K. In accordance with the invention, the prior art relationship W=HX in the example of a 5-window log W(n) is modified by considering the measurement in window 1 to be affected in a certain manner not only by radiation from materials in the undisturbed formations surrounding the borehole but also by (i) radiation from KCl in the borehole fluid and (ii) absorption (attenuation) by a strong absorber in the same borehole fluid. The measurements in windows 2 and 3 are considered in accordance with the invention to be affected both by (i) radiation from materials in the undisturbed formations and (ii) radiation from the KCl in the borehole fluid. In particular, it has been found that the contribution to the measurement in a given window from the KCl in the borehole fluid grows as a function of borehole size and KCl concentration for both centered and eccentered tools and that the contribution W(KCl) to the measurement in a given energy window which is due to KCl in the mud can be represented in the general case as $$W(KCl) = (KCl) \, a \, [1 - e^{-b(CAL-c)}]$$

where a, b and c are constants which can be derived empirically by tests with a given logging tool in test boreholes having known diameters and containing mud with known concentrations of KCl. In accordance with the invention, the following relationships have been found for the lowest three energy windows in the non-limiting example of a particular 5-window logging tool, where W(KCl) is the contribution to the measurement in an energy window due to the borehole fluid KCl, KCl is in percent concentration and CAL is in inches:

$$\begin{aligned} W1\,(KCl) &= (KCL)\,59.86\,(1 - e^{-.046(cal-3.62)}) = (KCL)\,f1\,(r) \\ W2\,(KCl) &= (KCl)\,22.16\,(1 - e^{-.078(cal-3.62)}) = (KCl)\,f2\,(r) \\ W3\,(KCl) &= (KCl)\,11.22\,(1 - e^{-.1136(cal-3.62)}) = (KCl)\,f3\,(r) \end{aligned} \qquad (1)$$

In accordance with the invention, the relationship between window measurements and Th,U,K concentrations (related by the logging tool sensitivity matrix H) can now be corrected for the influence of the mud filtrate KCl and B in the borehole fluid by accounting for the effect thereon on the lowest three energy windows, in a relationship described by the following expression:

$$\begin{vmatrix} [W1 - (KCl)f1(r)]/B \\ W2 - (KCl)f2(r) \\ W3 - (KCl)f2(r) \\ W4 \\ W5 \end{vmatrix} = |H| \begin{vmatrix} Th \\ U \\ K \end{vmatrix} \qquad (2)$$

The five unknowns in expression (2) are the borehole fluid KCl concentration and B correction and the concentrations of the three materials Th,U,K in the formations surrounding the borehole, and there are five relationships from which to find them. The five unknowns which best fit the measurements, when found in the manner discussed below, provide an initial estimate for the KCl and B at each depth level m in the borehole.

In step 56 (optimizing the estimates of KCl and B) use is made of the discovery that if there is no KCl in the borehole fluid then (i) an estimate of the uranium and thorium concentrations based on relating the five-windows log to the thorium, uranium and potassium concentrations through the logging sensitivity tool matrix H should agree with (ii) a two-window estimate for uranium and thorium based only on the radiation detected in the two highest windows. The two-window estimates for uranium and thorium are denoted U2 and TH2 and can be related to the radiation detected in the two highest energy windows by truncating the five-window relationship to arrive at the following, where U2 and TH2 designate the two-window estimates at a given depth level in the borehole and W4 and W5 designate respectively the radiation detected in the two highest energy windows at the same depth level:

$$U2 = 2.23\,W4 - 1.568\,W4 \qquad (3)$$

$$TH2 = 2.271\,W5 - 0.79\,W4$$

Any difference between the two-window estimates U2 and TH2 and five-window estimates U5 and TH5 derived on the basis of the prior art relationship W(n)=H

[Th,U,K] which is not due to statistical fluctuations should indicate the presence of KCl in the borehole fluid.

Because of the significant statistical fluctuations in the window measurements from one depth level to another and for other reasons, it has been found preferable to examine the entire borehole interval of interest rather than individual levels to find the appropriate concentration of KCl in the borehole fluid which minimizes the differences between the two-window and five-window estimates of uranium and thorium. The parameters to be minimized are the average deviations SIGU and SIGTH of the difference between the two- and five-window estimates of uranium and thorium, which can be described by:

$$(SIGU)^2 = \left[ \sum_{1}^{m} (U2 - U5)^2 \right] /m \quad (4)$$

$$(SIGTH)^2 = \left[ \sum_{1}^{m} (TH2 - TH5)^2 \right] /m$$

Figure 6:
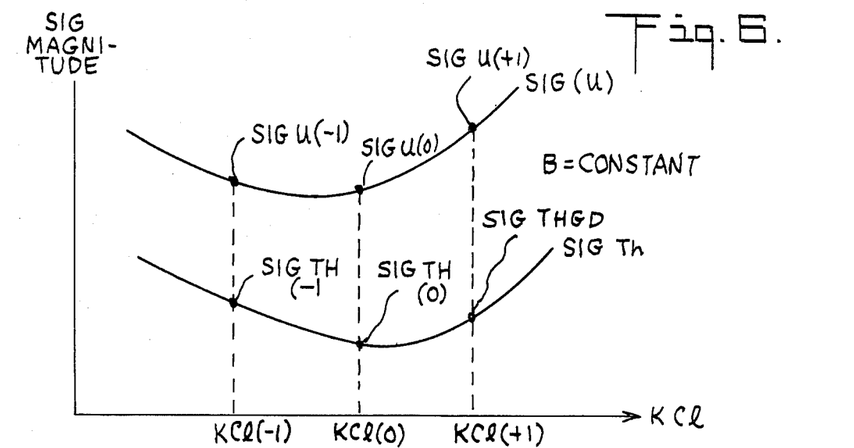
FIG. 6 illustrates the average deviations between the two-window and five-window estimates for uranium and thorium and is used in explaining an aspect of the invented process.

In accordance with the invention the average deviations SIGU and SIGTH are assumed to vary as parabolas with borehole fluid KCl concentration for a constant borehole fluid B and, accordingly, their minima can be found from knowing any three points on the respective parabolas. This is illustrated in FIG. 6, where each of the appropriately labelled curves is identified by three points. In an exemplary embodiment of the invention, the simple average of the level-by-level borehole fluid KCl and B derived at step 54 in FIG. 5 is used as an initial estimate, the B correction is held at this initial estimate and the KCl concentration is used to find the points in FIG. 6 which are labelled SIGU(0) and SIGTH(0). Holding the borehole fluid B correction constant, two other KCl concentrations are chosen, one just above and one just below the KCl(0) concentration just used, and two more points are found on each of the SIGU and SIGTH curves. The SIGU and SIGTH curves each defined by its respective three points are then fitted to quadratic functions of the borehole fluid KCl described by:

$$SIGU = a + b\, KCl + e\, (KCl)^2 \quad (5)$$

$$SIGTH = a' + b'\, KCl + e'\, (KCl)^2$$

The minima of the SIGU and SIGTH curves define respective minimizing KCl concentrations, and the task then is to find the borehole fluid B correction which makes the two minimizing borehole fluid KCl concentrations agree with each other. It has been discovered that the variations in the minimized KCl concentrations are acceptably linear in the narrow range of borehole fluid B corrections in the vicinity of the first estimate produced by averaging the KCl estimates from step 54.

Figure 7:
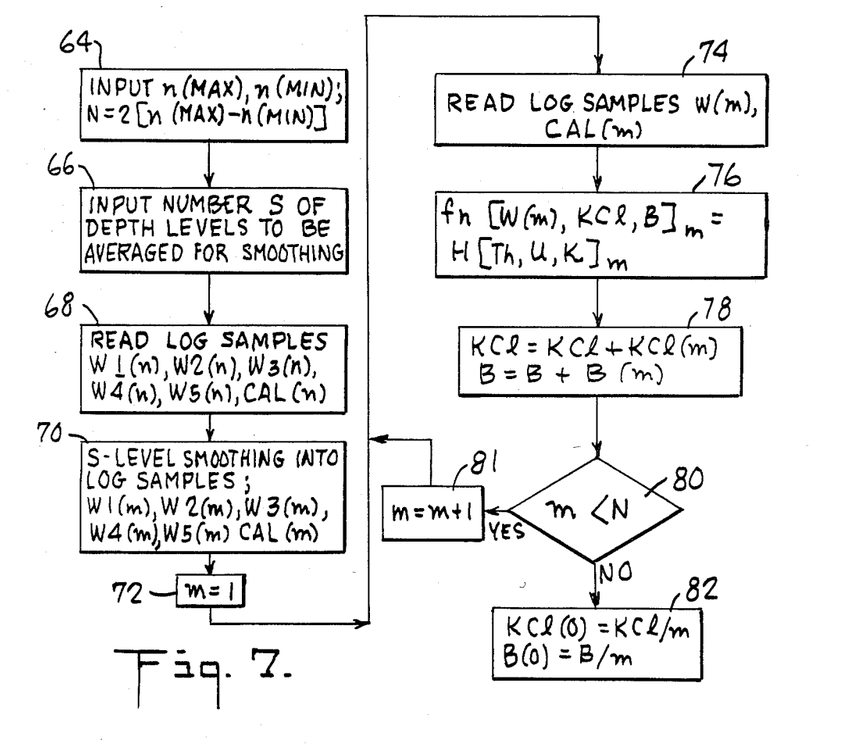
FIG. 7 is a more detailed flowchart illustrating a portion of an embodiment of the invented process.
Figure 8:
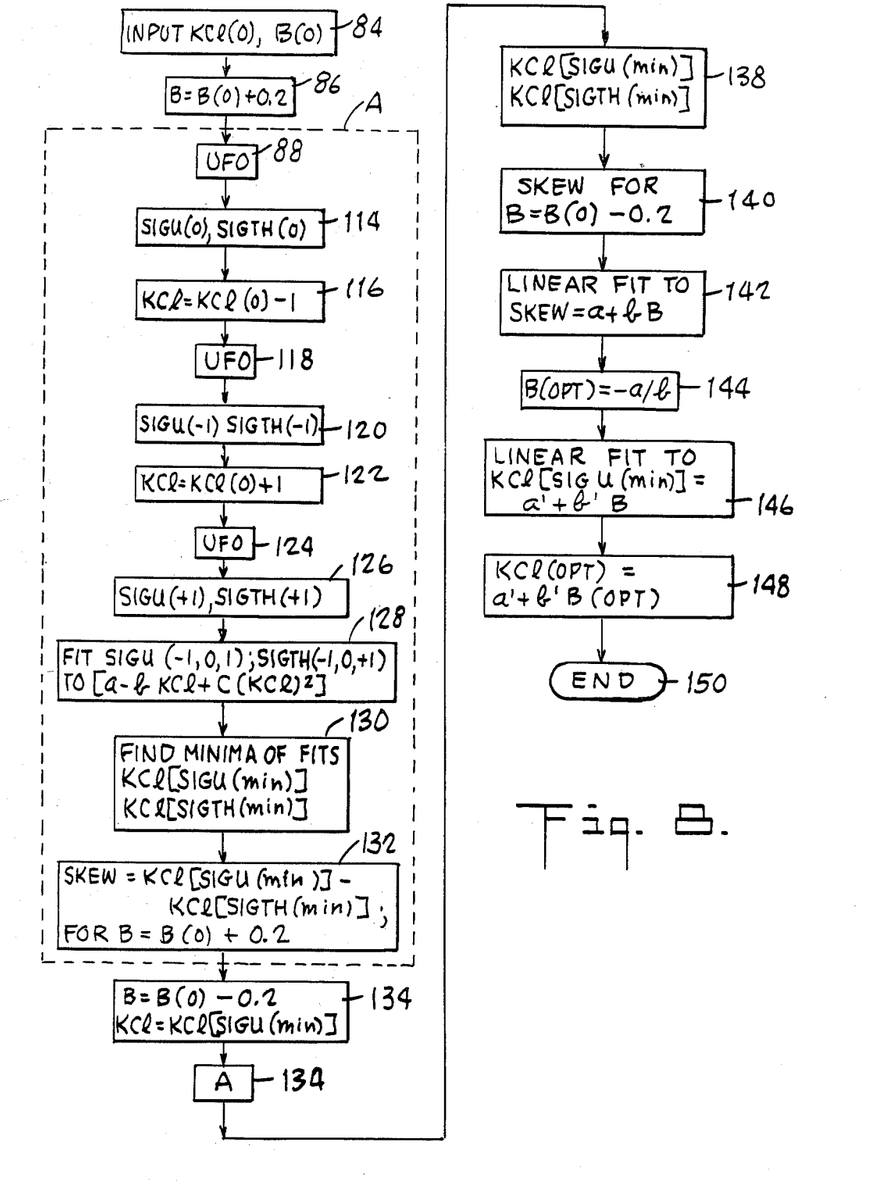
FIG. 8 is a flowchart illustrating another aspect of an embodiment of the invented process.
Figure 9:
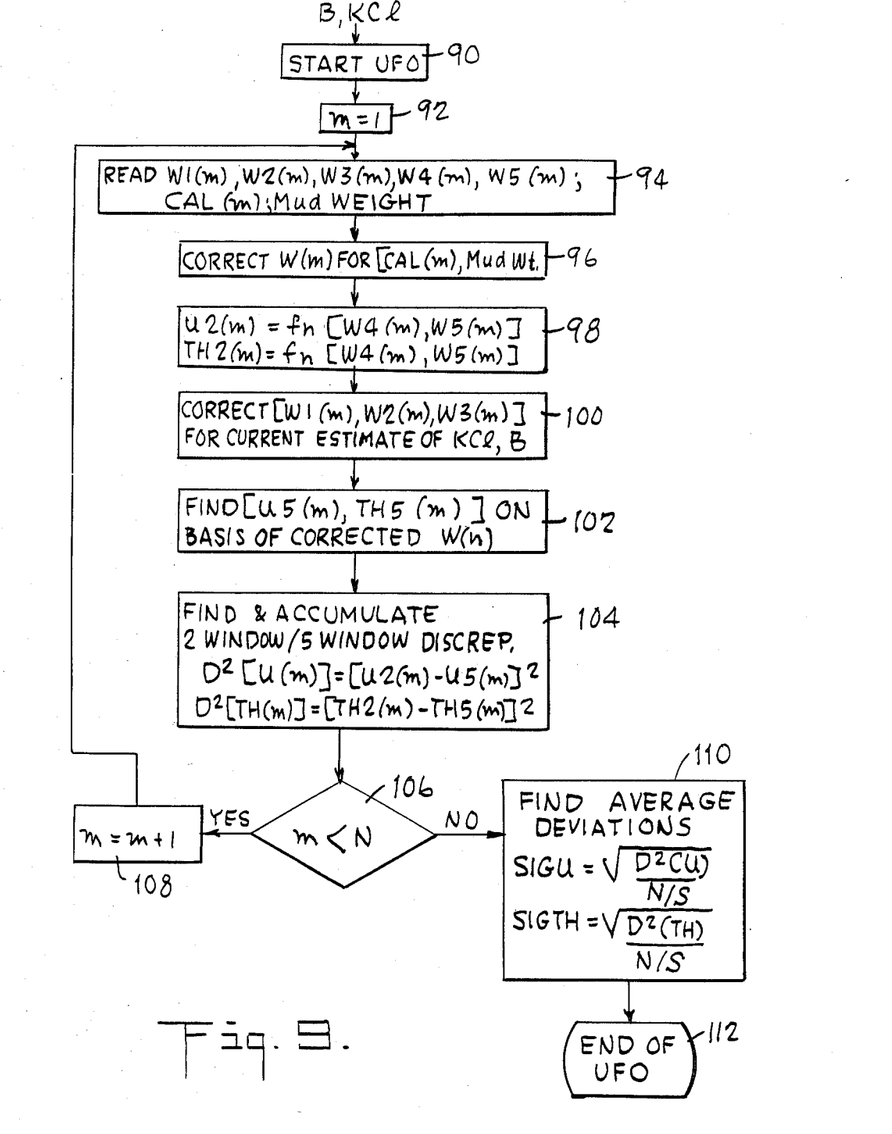
FIG. 9 is a flowchart illustrating a procedure used in the process of FIG. 8.

The example illustrated in terms of its major steps in FIG. 5 is shown in greater detail in flowchart form in FIGS. 7, 8 and 9. In FIG. 7 the process starts by defining in step 64 the borehole depth interval of interest: specifying its top depth level n(max) and its bottom depth level n(min). The total number of depth levels in the depth interval of interest is N. In step 66 the number of depth levels to be averaged for smoothing is selected by choosing a value for a number S. This number can be one if there would be no averaging and each depth level n is to be processed individually below, or it can be a number such as four or ten if several levels are to be averaged. The number S can vary in the same borehole: e.g., a depth interval which is known from other sources to be reasonably stable can be processed by using a higher value for S while a depth interval known to be less stable is processed by using a lower value for S. At step 68 the log samples of the five-windows log W(n) and the caliper log CAL are read by depth level n, and these log samples are averaged by S levels at step 70, to convert the W(n) and CAL(n) logs into respective W(m) and CAL(m) logs. For example, if S is five, the first five samples W1(n) in the first window of log W(n) are averaged into the first sample W1(m), the next five are averaged into the second sample W1(m), etc. At step 72 the process is pointed to the first borehole level in the sequence of averaged samples m, and at step 74 the process sequentially reads the samples W(m) and CAL(m). At step 76 the estimates of borehole fluid KCl and B and for the Th, U and K concentrations are found in accordance with the relationship discussed in connection with expression (2) above, e.g. by a standard process for finding five variables from a system of five linear relationships for a given depth level m. At step 78 the estimates of borehole fluid KCl and B by depth level m are respectively accumulated, and at step 80 a check is made to determine if the process is still within the depth level of interest and, if so, at step 81 the depth level m is incremented and the process runs again through steps 74 through 80. When the entire borehole depth level of interest has been so processed, step 80 leads to step 82, in which the averages KCl(0) and B(0) are found from the level-by-level estimates thereof.

Referring to FIG. 8, these initial estimates KCl(0) and B(0) are input at step 84 to start a process for optimizing the borehole fluid KCl concentration and B correction, i.e., a process for finding the KCl and B which agree most closely with the actual five energy window measurements made in the borehole. At step 86 the initial estimate of B correction is increased by a small amount, e.g. 0.2, and at step 88 a procedure designated UFO is used to find the average deviations SIGU and SIGTH discussed in connection with expression (4) above. The procedure UFO is illustrated in detail in FIG. 9, and is entered at step 90. At step 92 it points to the first depth level m, and step 94 reads, for the depth level m currently pointed to, the samples for the five energy windows and for the caliper log. In addition, step 94 can optionally read a mud weight estimate available from measurements made at the logging site. At an optional step 96 corrections are made in the five-window log for the caliper and the mud weight at the current depth level m using known techniques, so as to convert the five-energy-windows log into what the same log would have been for a standard (8-inch, water-filled) borehole. The appropriate corrections can be empirically found, by using a test borehole with a range of different mud weights and different borehole diameters. At step 98 the two-window estimates for uranium and thorium are found for the current depth level m as described in connection with expression (3) above, and at step 100 the current estimates of KCl and B are used to correct the samples for the current depth level m in the three lowest energy windows, in a process as discussed in connection with expressions (1) and (2) above. At step 100 the five-window estimates for uranium and thorium are found in a process as described in the prior art relationship W=HX, but on the basis of the five-windows log whose first three windows have been corrected in step 100 in the manner discussed in connection with expressions (1) and (2). In step 104 the discrepancies between the two-window estimates found in step 98 and the five-window estimates found in step 102 are found and accumulated, a test is made at step 106 to determine if the process is still within the borehole depth level of interest and, if so, the depth level index m is incremented at step 108 and the process returns to step 94. When the test at step 106 indicates that the end of the borehole interval of interest has been reached, the average deviations SIGU and SIGTH discussed above are found in accordance with the indicated relationships, and the procedure UFO ends at step 112.

Returning to FIG. 8 after the procedure described in connection with FIG. 9 has been run, the resulting first pair of average deviations are designated SIGU(0) and SIGTH(0) and are stored at step 114. At step 116 a new estimate of borehole fluid KCl is chosen by reducing the initial estimate KCl(0) by a small amount, e.g. one, and at step 118 the procedure UFO discussed in connection with FIG. 9 is run again, but this time using the new current estimates for KCl and B. The resulting average deviations are now designated SIGU(−1) and SIGTH(−1) and are stored in step 120. At step 122 another estimate of KCl is chosen as indicated, and at step 124 the procedure UFO is run again, for the new KCl estimate, to produce average deviations SIGU(+1) and SIGTH(+1), which are stored at step 126. The three pairs of points for the average deviations for SIGU and SIGTH are fitted at step 128 to the indicated quadratic function of the borehole fluid KCl concentration, and then step 130 stores the KCl estimates which correspond to the minima of the curves for the average deviations SIGU and SIGTH. At step 132 the skew defined by the indicated expression is found for a value of the B correction set at step 86, and at step 134 a new value of the B correction is chosen as indicated and the current estimate of KCl is set to the indicated level. At step 136 the entire procedure labelled A and discussed in connection with steps 88 and 114 through 132 above is run for the current estimates of KCL and B, and step 138 stores the resulting values for the newly found KCl concentrations. Step 140 finds a new value of Skew, using a relationship as in step 134 but for the new KCl values. The two values for Skew found at steps 134 and 140 are fitted linearly at step 142 to the indicated expression containing the sought B correction, and at step 144 the optimum value B(opt.) of the B correction is found as indicated. At step 146 the two values for the KCl concentration from steps 130 and 138 are fitted to the indicated linear expression, and at step 148 the optimum value KCl(opt.) for the KCl concentration is found as indicated, the process ending at step 150 after having found at steps 144 and 148 optimum levels KCl(opt.) and B(opt.) for the borehole fluid KCl concentration and B correction.

Figure 10:
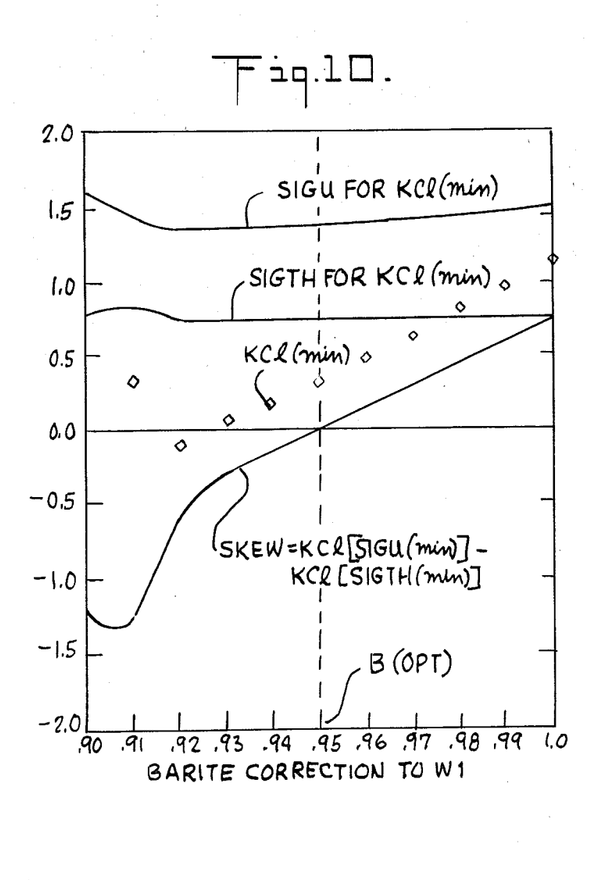
FIG. 10 is a graphical illustration of relationships leading to an optimum value of a correction for the presence of a strong gamma ray absorber in the borehole fluid.

The relationship between Skew and the minimizing values of KCl for the SIGU and SIGTH evaluations is illustrated in FIG. 10, in which the borehole fluid B correction has been allowed to vary from 0.9 to 1.0. At each value of the B correction, the value of the KCl concentration needed to minimize the average deviation SIGU has been determined from an estimate of the variation of SIGU with KCl for a particular example of actual logging measurements. The same is done for the SIGTH estimate, resulting in another estimate for KCl. The difference between these two estimates is denoted as the Skew discussed above in connection with steps 132 and 140 of FIG. 8, and is shown as a function of the B correction in FIG. 10. An observation can be made from FIG. 10 that the minimum values of the SIGU and SIGTH deviations are not too sensitive to the value of the B correction, but the consistency of the derived KCl value is, as represented by the sequence of points on FIG. 10 labelled KCl(min). The example of FIG. 10 indicates the presence of a strong absorber (in this case, barite) in the borehole fluid with a correction factor for the first window of the five-windows log of about 0.95, and about 0.4% KCl.

Figure 11:
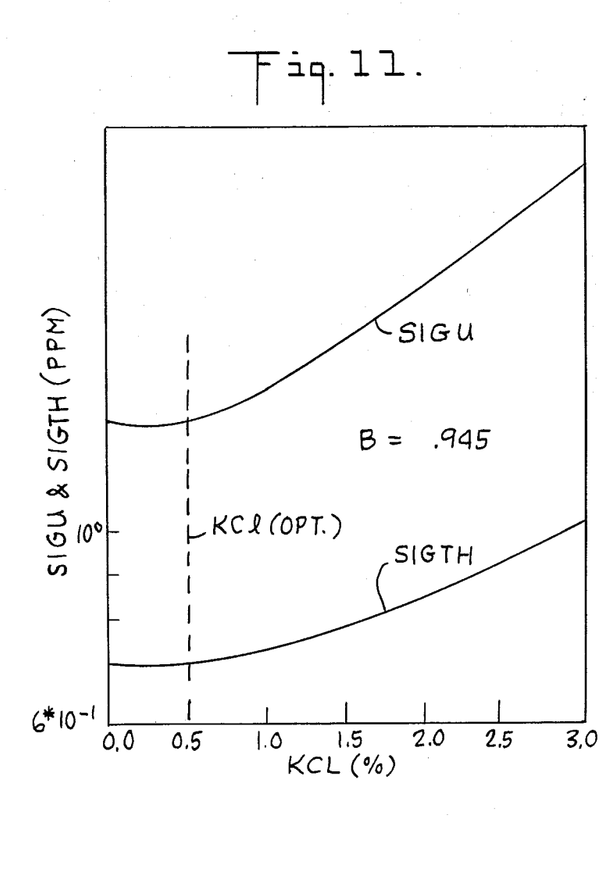
FIG. 11 is a graphical illustration of relationships leading to an optimum value for KCl concentration in the bordhole fluid.

The variation of the average deviations SIGU and SIGTH with the B correction fixed at 0.945 is illustrated in FIG. 11, which is also based on actual logging measurements. As seen in FIG. 11, the mud filtrate KCl concentration which makes the two curves coherent, is about 0.5%.

These optimized levels of KCl concentration and B correction are used in step 58 (FIG. 5) to correct the five-windows log at each depth level n, in a process as described in connection with expressions (1) and (2), and the corrected W(n) samples are used at step 60 to find a corrected log of the concentration of thorium, uranium and potassium, in a process as described in connection with expression (2) in which a solution is found for the three unknowns Th,U,K. At step 62 the so found parameters can be stored, recorded and/or plotted as discussed, e.g., to produce a tangible representation of the corrected TH,U,K log, e.g., as a plot of the type illustrated in FIG. 4B.

The process discussed above can be carried out on a general purpose digital computer of suitable size and configuration, using the appropriate peripheral equipment necessary to carry out the functions discussed above. In such embodiment each step discussed above in connection with FIGS. 7-9 is defined by one or a few statements in a high level computer language such as Fortran, on the basis of which the computer equipment is arranged to operate as a special purpose machine carrying out the process described above.

It should be clear that the process described above is only an example of carrying out the invention, and that the invention is not limited to that particular example but includes any other embodiment thereof which is within the scope of the appended claims.

What is claimed is:

1. A well logging method comprising the steps of:
   deriving a log of natural gamma radiation detected in respective energy windows in a selected depth interval of a borehole containing borehole fluid comprising at least one of (i) a gamma ray emitting substance and (ii) a substance which is a strong attenuator of gamma rays;
   converting the windows log into a log of selected gamma radiation emitting subsurface materials in the formations surrounding the borehole which is substantially corrected for at least one of said (i) emitting substance in the borehole fluid and (ii) strongly attenuating substance in the same borehole fluid; and
   producing a tangible representation of said subsurface materials log.

2. A well logging method as in claim 1 in which the deriving step comprises deriving a log of the natural gamma radiation detected in each respective one of at least five energy windows, and the converting step comprises converting the windows log into a log of at least Thorium, Uranium and Potassium in the subsurface formations surrounding the selected borehole interval.

3. A well logging method as in claim 2 in which the deriving step comprises passing a well logging tool through said borehole interval and deriving said windows log therefrom.

4. A well logging method as in claim 1 in which the borehole fluid comprises both of said substances and the converting step comprises converting the windows log into a log of the subsurface materials which is substantially corrected for both of said substances in the borehole fluid.

5. A well logging method as in claim 1 in which the converting step comprises substantially correcting the windows log for at least one of said substances and deriving the materials log from the resulting corrected windows log.

6. A well logging system as in claim 5 in which the windows are at respective successively higher energies, and the step of correcting the windows log comprises correcting the log of the radiation detected in the lowest energy window for both the gamma ray emitting substance and the gamma ray attenuating substance in the borehole fluid, and correcting the logs of the radiation detected in the second and third higher energy windows for only the gamma ray emitting substance in the borehole fluid.

7. A well logging method as in claim 1 in which the windows are at respective successively higher energies, and the converting step comprises correcting the windows log for the effect of the borehole size on the logs of the radiation detected in each of the three lowest energy windows, and utilizing the resulting corrected windows log to derive the materials log.

8. A well logging method as in claim 1 in which the converting step comprises finding an estimate of the emitting substance and an estimate of the attenuating substance in the borehole fluid, optimizing the estimates for consistency with each other and with the windows log, correcting the windows log on the basis of the optimized estimates, and utilizing the resulting corrected windows log to derive the materials log.

9. A well logging method as in any one of claims 1 through 8 in which the windows log comprises a log of radiation detected in each of at least five energy windows and the materials log comprises a log of at least Thorium, Uranium and Potassium.

10. A well logging method as in any one of claims 1 through 8 in which the step of producing a tangible representation of the materials log comprises producing one or more visible log traces on a record medium.

11. A well logging method comprising the steps of:
deriving a log of radiation detected in respective energy windows for a selected depth interval of a borehole which traverses subsurface formations and is packed with borehole fluid containing a substance emitting radiation and a substance strongly attenuating radiation;
generating from said windows log an estimate of the effect thereon of at least one of said substances; and
producing from said windows log a log of respective radiation emitting materials in the subsurface formations surrounding the borehole interval which is substantially corrected for said estimate of the effect on the windows log of said at least one substance.

12. A well logging method as in claim 11 in which the producing step comprises correcting the windows log for said estimate generated in the generating step and producing the materials log from the resulting corrected windows log.

13. A well logging method as in claim 12 in which the generating step comprises generating an estimate of the effect on the windows log of both of said substances in the borehole fluid.

14. A well logging method as in claim 13 in which the deriving step comprises deriving a log of radiation detected in at least five energy windows which are at respective successively higer energies, and the generating step comprises generating an estimate of the effect of both of said substances on the log of the radiation detected in the lowest energy window and of the effect of only the borehole fluid emitting substance on the logs of the radiation detected in the second and third higher energy windows.

15. A well logging method as in claim 14 in which the generating step comprises including in said estimate the effect of the borehole size on the logs of the radiation detected in the lowest three energy windows.

16. A well logging method as in any one of claims 11 through 15 in which the deriving step comprises deriving a log of natural gamma radiation rather than radiation resulting from using a borehole tool source.

17. A well logging method as in claim 16 in which the producing step comprises producing a log of at least Thorium, Uranium and Potassium in the subsurface formations surrounding the borehole interval.

18. A well logging method as in claim 17 in which the producing step comprises producing a record of said materials log in the form of at least one visible log trace on a record medium.

19. A well logging method comprising the steps of:
deriving a log of natural gamma radiation detected in respective energy windows for a selected depth interval of a borehole which traverses subsurface formations and contains borehole fluid comprising a substance emitting natural gamma radiation and a substance strongly attenuating said radiation;
finding from the windows log respective estimates of the effects of said substances on the windows log, and optimizing said estimates for consistency with each other and with the windows log; and
utilizing said windows log and said optimized estimates to produce a log of respective selected subsurface materials which are in the formations surrounding the borehole interval and which emit natural gamma radiation.

20. A well logging method as in claim 19 in which the deriving step comprises deriving a log of the radiation detected in at least five energy windows and the utilizing step comprises producing a log of at least Thorium, Uranium and Potassium in the formations surrounding the borehole interval.

21. A well logging method as in claim 20 in which the emitting substance in the borehole fluid comprises Potassium and the attenuating substance in the borehole fluid comprises at least one of Barite and hematite.

22. A well logging method as in claim 21 in which the deriving step comprises passing a logging tool through said borehole interval and deriving the windows log therefrom.

23. A well logging method comprising the machine-implemented steps of:

deriving a log of natural gamma radiation detected in respective energy windows in a selected depth interval of a borehole which traverses subsurface earth formations and contains borehole fluid comprising at least one of (i) a substance which emits gamma rays and (ii) a substance which strongly attenuates gamma rays;

utilizing the window log to find an estimate of at least one of (i) the increase in the detected radiation represented by the windows log due to the gamma ray emitting substance in the borehole fluid and (ii) the attenuation of the detected radiation represented by the windows log due to the strongly attenuating substance in the borehole fluid; and correcting the window log by removing therefrom at least one of said increase and attenuation based on said estimate, and converting the resulting corrected windows log into a log of selected gamma ray emitting materials in the formations surrounding the selected borehold interval.

24. A well logging method as in claim 23 in which the utilizing step comprises finding an estimate of both said increase and said attenuation, and the correcting step comprises removing from the windows log the estimated contributions due to both said increase and said attenuation.

25. A well logging method comprising the steps of:
deriving a log of natural gamma radiation detected in selected energy windows by a logging tool passed through a selected depth interval of a borehole which extends through subsurface earth formations and contains borehole fluid;

wherein said borehole fluid contains at least one of (i) a gamma ray emitting substance and (ii) a substance which strongly attenuates gamma radiation;

converting said energy windows log into a log of selected gamma radiation emitting subsurface materials which is substantially corrected for deleterious effects of at least one of said emitting substance and attenuating substance in said borehole fluid; and producing a tangible representation of said corrected log of the selected subsurface materials.

26. A well logging method as in claim 25 in which the converting step comprises:
finding, for each respective one of a succession of borehole depth levels, respective initial estimates of a borehole fluid emitting substance concentration and attenuating substance correction;

optimizing the resulting succession of concentrations and corrections found for the respective depth levels to produce a single value of each; and utilizing said single values to correct the energy windows log for the influence thereon of the gamma ray emitting substance and the gamma ray attenuating substance in the borehole fluid, and using the resulting corrected windows log to produce said corrected log of the selected subsurface materials.

27. A well logging method as in claim 26 in which the step of producing said initial estimates for the respective depth levels in the borehole comprises deriving said estimates on the basis of a matrix relationship between (i) the natural gamma radiation detected in the respective energy windows and an assumed correction thereto due to the borehole fluid gamma ray emitting and attenuating substances, (ii) an empirically derived logging tool sensitivity matrix, and (iii) the concentrations of said selected subsurface materials.

28. A well logging method as in claim 27 in which the windows are at respective successively higher energies, and the step of producing said initial estimates for the respective depth levels in the borehole comprises correcting for the effect of both the gamma ray emitting substance and the gamma ray attenuating substance in the borehole fluid on the log of the radiation detected in the lowest energy window, and for the effect of only the borehole fluid gamma ray emitting substance on the logs of the radiation detected in the second and third higher energy windows.

29. A well logging method as in claim 28 in which the step of producing the initial estimates for the respective depth levels in the borehole comprises correcting for the effects of the borehole size on the logs of the radiation detected in each of the three lowest energy windows.

30. A well logging method as in claim 26 in which said optimizing step comprises optimizing said single values of the borehole fluid emitting substance concentration and attenuating substance correction for best fit to the natural gamma radiation detected in all of the respective energy windows.

31. A well logging method as in claim 30 in which said optimizing step comprises:
producing first initial estimates of the concentrations of at least some of said selected materials which are based on the radiation detected in some but not all of the energy windows and second initial estimates based on the radiation detected on all of the energy windows;

finding the two respective borehole fluid emitting substance concentrations which minimize discrepancies between said first and second initial estimates of said at said least some selected materials for each of a plurality of assumed borehole fluid attenuating substance corrections; and finding a single borehole fluid emitting substance concentration and a single borehole fluid attenuating substance correction which tend to be consistent with each other and with the energy windows log for the entire selected depth interval of the borehole.

32. A well logging method as in claim 25 in which the step of deriving the windows log comprises passing a logging tool through said selected depth internal of the borehole and deriving said windows log therefrom.

33. A well logging method as in any one of claims 25–32 in which the windows log comprises a log of natural gamma radiation detected in each respective one of at least five energy windows rather than radiation due to using a borehole tool source.

34. A well logging method as in claim 33 in which the selected materials log comprises a log of at least Thorium, Uranium and Potassium in the undisturbed formations surrounding said selected depth interval of the borehole.

35. A well logging system comprising:
means for deriving a log of natural gamma radiation detected in respective energy windows in a selected depth interval of a borehole containing borehole fluid comprising at least one of (i) a gamma ray emitting substance and (ii) a substance which is a strong attenuator of gamma rays; and means for converting the windows log into a log of selected gamma radiation emitting subsurface materials in the formations surrounding the borehole which is substantially corrected for of at least one of said (i) emitting substance in the borehold fluid and (ii) strongly attenuating substance in the same borehole fluid, and for producing a tangible representation of said subsurface materials log.

36. A well logging system as in claim 35 in which the deriving means comprise means for deriving a log of the natural gamma radiation detected in each respective one of at least five energy windows, and the converting means comprise means for converting the windows log into a log of at least Thorium, Uranium and Potassium in the subsurface formations surrounding the selected borehole interval.

37. A well logging system as in claim 35 or 36 in which the deriving means comprise means for passing a logging tool through the borehole and for deriving the windows log therefrom.

* * * * *